(12) United States Patent
Maroncelli et al.

(10) Patent No.: US 12,141,069 B2
(45) Date of Patent: Nov. 12, 2024

(54) PREFETCH STORE FILTERING

(71) Applicant: Arm Limited, Cambridge (GB)

(72) Inventors: Luca Maroncelli, Cambridge (GB); Cedric Denis Robert Airaud, Cambridge (GB); Florent Begon, Cambridge (GB); Peter Raphael Eid, Cambridge (GB)

(73) Assignee: Arm Limited, Cambridge (GB)

( * ) Notice: Subject to any disclaimer, the term of this patent is extended or adjusted under 35 U.S.C. 154(b) by 14 days.

(21) Appl. No.: 18/147,068

(22) Filed: Dec. 28, 2022

(65) Prior Publication Data
US 2024/0028516 A1 Jan. 25, 2024

(30) Foreign Application Priority Data
Jul. 21, 2022 (EP) .................... 22306095

(51) Int. Cl.
*G06F 12/0862* (2016.01)
*G06F 12/0875* (2016.01)

(52) U.S. Cl.
CPC ...... *G06F 12/0862* (2013.01); *G06F 12/0875* (2013.01); *G06F 2212/6022* (2013.01)

(58) Field of Classification Search
CPC ............. G06F 12/0862; G06F 12/0875; G06F 2212/6022
See application file for complete search history.

(56) References Cited

U.S. PATENT DOCUMENTS

| | | | |
|---|---|---|---|
| 10,346,360 B1* | 7/2019 | Basov | G06F 16/182 |
| 2015/0106590 A1* | 4/2015 | Chou | G06F 11/3037 712/207 |
| 2023/0222066 A1* | 7/2023 | Karve | G06F 12/0871 711/137 |
| 2023/0315631 A1* | 10/2023 | Fried | G06F 12/0804 711/122 |

* cited by examiner

*Primary Examiner* — Mark A Giardino, Jr.
(74) *Attorney, Agent, or Firm* — NIXON & VANDERHYE P.C.

(57) ABSTRACT

A data processing apparatus is provided. Prefetch circuitry generates a prefetch request for a cache line prior to the cache line being explicitly requested. The cache line is predicted to be required for a store operation in the future. Issuing circuitry issues the prefetch request to a memory hierarchy and filter circuitry filters the prefetch request based on at least one other prefetch request made to the cache line, to control whether the prefetch request is issued by the issuing circuitry.

13 Claims, 4 Drawing Sheets

|     | 101 | 69 68 | | | 4 | 3 | 0 |
|-----|-----|-------|---|---|---|---|---|
| | Base | Marks | | | | Age | |
| | 0xFF112211 | F00A | 0000 | 0000 | 0000 | 4 | |
| | 0x41114BB0 | 0000 | 0008 | 0000 | 0000 | 7 | |
| | 0x3BC41100 | FFFF | 0000 | 0080 | 0000 | 1 | |
| | 0x00001110 | FFFF | FFFF | FFFF | FFFF | 2 | |
| | 0x1100BB00 | FFFF | FF0F | FFFF | FFFF | 0 | |

| 44 | 12 11 | 5 4 | 3 0 |
|----|-------|-----|-----|
| Base | Marks | T/B | Age |
| 0x14CDE101 | 12 | T | 3 |
| 0x41102DE0 | 40 | B | 7 |
| 0x11004EE0 | 0 | T | 6 |
| 0x12DEF000 | 62 | B | 0 |

PREFETCH STORE FILTERING

CROSS-REFERENCE TO RELATED APPLICATIONS

This application claims priority pursuant to 35 U.S.C. 119(a) to European Application No. 22306095.5, filed Jul. 21, 2022, which application is incorporated herein by reference in its entirety.

TECHNICAL FIELD

The present disclosure relates to data processing.

BACKGROUND

In a data processing apparatus, store instructions cause data to be written to a memory hierarchy. The manner in which the storage occurs depends on a number of factors—one of which is the amount of data being written. Typically it is not possible to write only a single byte to memory. This is instead achieved by obtaining a chunk (e.g. a cache line) of data, modifying the single byte, and then write the whole cache line with the modified single byte back to memory. The latency that occurs with fetching the chunk of data can be alleviated by prefetching, which in this specific scenario is known as store prefetching. In contrast, however, when an entire cache line of data is to be written to memory, the data is being entirely overwritten and so prefetching of the data is wasteful. It is desirable for a system to be able to efficiently deal with a mix of write types so as to prefetch where this would be beneficial, but not to prefetch where to do so would be unnecessary.

SUMMARY

Viewed from a first example configuration, there is provided a data processing apparatus comprising: prefetch circuitry configured to generate a prefetch request for a cache line prior to the cache line being explicitly requested, wherein the cache line is predicted to be required for a store operation in the future; issuing circuitry to issue the prefetch request to a memory hierarchy; and filter circuitry configured to filter out the prefetch request based on at least one other prefetch request made to the cache line, to control whether the prefetch request is issued by the issuing circuitry.

Viewed from a second example configuration, there is provided a data processing method comprising: generating a prefetch request for a cache line prior to the cache line being explicitly requested, wherein the cache line is predicted to be required for a store operation in the future; filtering the prefetch request based on at least one other prefetch request made to the cache line, to control whether the prefetch request is issued; and issuing the prefetch request to a memory hierarchy in dependence on the filtering.

Viewed from a third example configuration, there is provided a non-transitory computer-readable medium to store computer-readable code for fabrication of a data processing apparatus comprising: prefetch circuitry configured to generate a prefetch request for a cache line prior to the cache line being explicitly requested, wherein the cache line is predicted to be required for a store operation in the future; issuing circuitry to issue the prefetch request to a memory hierarchy; and filter circuitry configured to filter out the prefetch request based on at least one other prefetch request made to the cache line, to control whether the prefetch request is issued by the issuing circuitry.

BRIEF DESCRIPTION OF THE DRAWINGS

The present invention will be described further, by way of example only, with reference to embodiments thereof as illustrated in the accompanying drawings, in which:

FIG. 4A shows a first example of an implementation of the store prefetch filter; and FIG. 4B shows a second example of an implementation of the store prefetch filter.

DESCRIPTION OF EXAMPLE EMBODIMENTS

Figure 1:
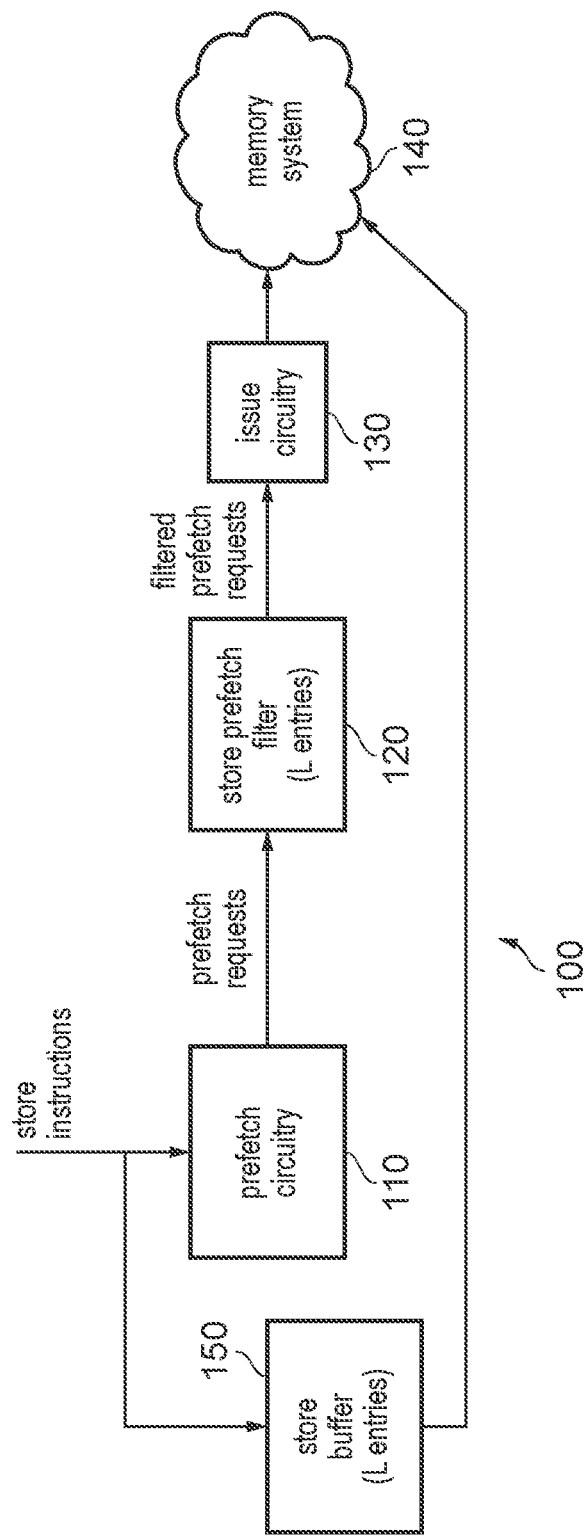
FIG. 1 illustrates a data processing apparatus in accordance with some examples.

Before discussing the embodiments with reference to the accompanying figures, the following description of embodiments is provided.

In accordance with one example configuration there is provided a data processing apparatus comprising: prefetch circuitry configured to generate a prefetch request for a cache line prior to the cache line being explicitly requested, wherein the cache line is predicted to be required for a store operation in the future; issuing circuitry to issue the prefetch request to a memory hierarchy; and filter circuitry configured to filter out the prefetch request based on at least one other prefetch request made to the cache line, to control whether the prefetch request is issued by the issuing circuitry.

In these examples, filter circuitry is provided in order to filter out some of the prefetch requests that are generated, thus preventing or inhibiting those prefetch requests from being issued to the memory hierarchy (which may include one or more caches and a main memory backed by DRAM). Whether or not a generated prefetch request is filtered out depends on at least one other prefetch request that has been made to the cache line for which the prefetch request relates. In this way, it is possible to control on a case-by-case basis, whether store prefetches occur or not. In particular, it is possible to prefetch data where that prefetching of data would be appropriate and beneficial. In contrast, such prefetching can be inhibited or not carried out where it would have little or no benefit. Note that although a request can be filtered out based on at least one other prefetch request, it may be allowed to proceed based on no other prefetch requests occurring.

In some examples, the filter circuitry is configured to filter out the prefetch request based on an amount of the cache line that is required by the at least one other prefetch request. It will be appreciated that, of course, a prefetch is made in respect of an entire cache line. However, the amount of the cache line that is required relates to the amount of the cache line that is predicted as being modified in the predicted access (e.g. to an offset of a cache line and a size of access). If, in the other prefetch request(s), only part of a cache line was predicted to be modified then the question as to whether prefetching occurs for that line could be different as compared to a situation where the entire cache line was is to be modified.

In some examples, the filter circuitry is configured to filter out the prefetch request such that the prefetch request is inhibited from being issued by the issue circuitry in response to all of the cache line being predicted as being accessed by one or more predicted accesses for which the at least one other prefetch request is generated. Consequently, when all of the cache line is intended to be modified by the other prefetch request(s) (and therefore none of the existing cache line is actually required), the data is not prefetched since that data is ultimately entirely overwritten and the obtaining of that data is therefore unnecessary. By avoiding this kind of prefetch, memory bandwidth can be saved by avoiding the unnecessary transfer of unused data. In addition, energy expenditure is reduced as a consequence of unnecessary memory accesses and data transfer taking place. A still further advantage is that eviction of data from caches is reduced—since new items are not being unnecessarily brought into caches (causing eviction of old data). Note that the question of whether the entire cache line has been modified is considered over several of the other prefetch request(s). Thus, one prefetch request might be made in respect of half of the cache line and a second prefetch operation might be made in respect of the other half of the cache line. In this situation, the other prefetch requests are said to (collectively) modify the entire cache line—it is therefore not a requirement (although it may be the case) that one single prefetch request was fetching all of the data of an entire cache line at once.

In some examples, the filter circuitry is configured to filter out the prefetch request such that the prefetch request is issued by the issue circuitry in response to only a part of the cache line being predicted as being accessed by one or more predicted accesses for which the at least one other prefetch request is generated. Where at least part of the cache line is required, it is necessary for the (entire) cache line to be obtained so that the unmodified parts of the cache line can be written back, unmodified. In these situations, it is helpful for a prefetch to occur so that the effective memory latency is reduced. Therefore, if the previous prefetch request(s) collectively did not request the entirety of the cache line, then a prefetch for that cache line is allowed to take place.

In some examples, the at least one other prefetch request is one of a previous predetermined number of recent prefetch requests. The other prefetch request(s) are therefore considered over a window of all most recent prefetch request(s).

In some examples, the data processing apparatus comprises: a store buffer configured to buffer store operations prior to being issued to the memory hierarchy, wherein the store buffer is configured to merge those of the store operations that are directed towards a same cache line. A store buffer is used to temporarily buffer store requests before they are sent to a memory hierarchy, in order to enable the store requests to be merged (where possible). Thus, if several different store requests are made in quick succession to neighbouring bytes of a cache line, then these can be buffered and merged at the store buffer. Consequently, only a single store request needs to be issued from the store buffer to the memory hierarchy rather than all of the requests being separately issued. In this way, it is possible to reduce bandwidth in the system. The store buffer is distinct from the filter circuitry, which is instead directed towards prefetching.

In some examples, the filter circuitry is configured to store a plurality of entries, each of the entries having an associated cache line; and for each of the entries, the filter circuitry is configured to track parts of the associated cache line to which the at least one other prefetch request has been made. In this way, over the other prefetch request(s) it is possible to determine what quantity of a cache line has been requested.

In some examples, a capacity of the store buffer is at least as big as a capacity of the filter circuitry. The store buffer and the filter circuitry both seek to determine what quantity of a cache line is modified over a number of previous operations. Each of the circuits operates over a window of previous operation(s). It is therefore advantageous for both the store buffer and the filter circuitry to operate with a similar window size so that they behave and make decisions in a similar manner. In practice, it is acceptable for the store buffer to be larger than the filter circuitry. This is because if the store buffer is too small, it will result in prefetches being sent where it turns out the data is fetches unnecessarily. This might attract a performance penalty, it is not as big of a penalty as failing to prefetch data that is required.

In some examples, the filter circuitry is configured to store, for each of the entries, an N-bit bitfield to indicate which of the N bytes of the associated cache line are predicted as being accessed by predicted accesses for which the at least one other prefetch request is generated. One way of tracking how much of a cache line is predicted as being accessed is to provide a single bit for each byte of the cache line. For each byte in the cache line that is predicted to be modified, the bit corresponding to that byte can be marked. When all of the bytes are marked in this way, it can be determined that the entire cache line is to be modified. Of course, it is possible to track cache lines at a granularity other than bytes. For instance, if a cache line is made up of M words, then an M-bit bitfield could be provided to track the request of each word in the cache line. Other levels of granularity are of course possible.

In some examples, the filter circuitry is configured to store, for each of the entries, an offset within the associated cache line; and an indication of which of: bytes in the cache line above the offset and bytes in the cache line below the offset are predicted as being accessed by predicted accesses for which the at least one other prefetch request is generated. As an alternative to tracking each individual fragment of a cache line, as described above, one could instead track what contiguous proportion of the cache line has been predicted to be required from one end of the cache line. That is, if a cache line is made up of 64 bytes, one might simply track that bytes 0-15 or that bytes 56-63 have been required. In each of these two examples, a next access to bytes 32-40 would not be tracked, but an access to bytes 16-23 (in the first example) or 48-55 (in the second example) would expand the range of tracked bytes to 0-24 and 48-63 respectively. Such information can be represented more efficiently and recognises the fact that, much of the time, a partial prefetch of a cache line occurs because the bytes that are predicted to be modified spans two cache lines (i.e. is not aligned with the cache line boundaries). This is especially true if memory is modified sequentially in a manner that does not align with cache line boundaries. Here, entire cache lines can be modified, yet never in a single operation. This can therefore be tracked by simply knowing whether an upper or lower portion of the cache line has been prefetched and how big that portion is. As before, this need not necessarily be carried out at a byte level of granularity. It could instead, for instance, be monitored at a word level of granularity.

In some examples, the offset is represented using a $\log_2(N)$ bit bitfield, where N is the number of fragments of the associated cache line that are individually tracked; and the indication is represented using a 1-bit field. For example, if each individual byte of the cache line is tracked, and if the cache line has 64 bytes, then a $\log_2(64)$ bit bitfield (i.e. a 6-bit bitfield) can be used in order to count an offset from an edge of the cache line. In addition, a further one bit is provided to indicate whether the offset is from or towards a top of the cache line or a bottom of the cache line. The offset can be used to store the unmodified parts of the cache line or the modified parts of the cache line. In either case, the other part of the cache line can be determined by inversion. For instance, if the number "16" is stored and the indication is that this extend from the bottom of the cache line then this could represent that the bottom 16 bytes have been modified (in which case the top 48 bytes in a 64 byte cache line have been modified) or it could represent that the bottom 16 bytes have not been modified (in which case the top 48 bytes in a 64 byte cache line are unmodified).

In some examples, the prefetch request is a store prefetch request; and the at least one previous prefetch request is at least one other store prefetch request. That is, the prefetch request is sent in preparation for a store operation being performed. At least some of the data being prefetched is therefore expected to be overwritten by a future store operation.

Particular embodiments will now be described with reference to the figures.

FIG. 1 illustrates a data processing apparatus 100 in accordance with some examples. Instructions such as store instructions (or operations) are received by the prefetch circuitry over a period of time. This enables the prefetch circuitry 110 to detect access patterns and thereby determine the relationship between accesses—for instance, if a store of 8 bytes is performed on memory location X then it may be likely for another store of 8 bytes to be performed at another memory location X+Y. That is, both the pattern of access addresses and the pattern of access sizes can be tracked. When such patterns are determined with a particular confidence, then future accesses may cause prefetch requests to be generated by the prefetch circuitry 110. A store prefetch filter 120 is used to filter some of these prefetch instructions, as will be discussed in detail below. This store prefetch filter 120 is influenced by other store prefetch requests that have been made. The filtered prefetch instructions are then issued to a memory system 140 by issue circuitry 130. Note that in this example, therefore, the prefetch circuitry 110 predicts accesses to addresses (which may include offsets within cache lines) as well as the size of those accesses. For convenience, we assume here that the prefetch requests themselves indicate the address (and/or cache line offset) and size of the predicted access request for which the prefetch request itself was generated.

The filtering performed by the store prefetch filter 120 is designed to inhibit prefetches for cache lines where the cache line is predicted to be fully modified. This recognises that prefetching a cache line where the contents will be fully modified is wasteful of resources such as bandwidth. In contrast, cache lines whose contents will be expected to be only partly modified are still prefetched, thereby allowing the benefits of prefetching to be enjoyed.

In the above example, prefetch requests are generated and then deleted if the store prefetch filter 120 deems it appropriate. In other examples, the prefetch request is only generated in the first place if permitted by the store prefetch filter 120.

The store requests that are used to train the prefetch circuitry 110 are also stored in a store buffer 150. The store buffer 150 attempts to merge store operations together so that they can be issued in a single request rather than as a series of requests. Each store operation can therefore be held in the store buffer 150 for a period of time to see whether it can be merged with other incoming store requests.

In this example, the capacity of the store buffer 150 and the store prefetch filter 120 is 'L' entries. That is, the capacity is the same. In other examples, the size of the store prefetch filter 120 is no bigger than the capacity of the store buffer 150. This helps to provide the store prefetch filter 120 with a similar 'view' to that of the store buffer 150. In particular, both systems provide a form of 'merging' to see whether cache lines can be completed. It may therefore be useful for both systems to implement similar aging policies/mechanisms, and this is affected by the capacity of each of the store buffer 150 and the store prefetch filter 120. The store prefetch filter 120 can be smaller than the store buffer 150. In practice, this makes it slightly less likely that a prefetch will be avoided. However, the performance cost associated with unnecessarily performing a prefetch is smaller than the performance cost of not performing a prefetch when appropriate.

Figure 2:
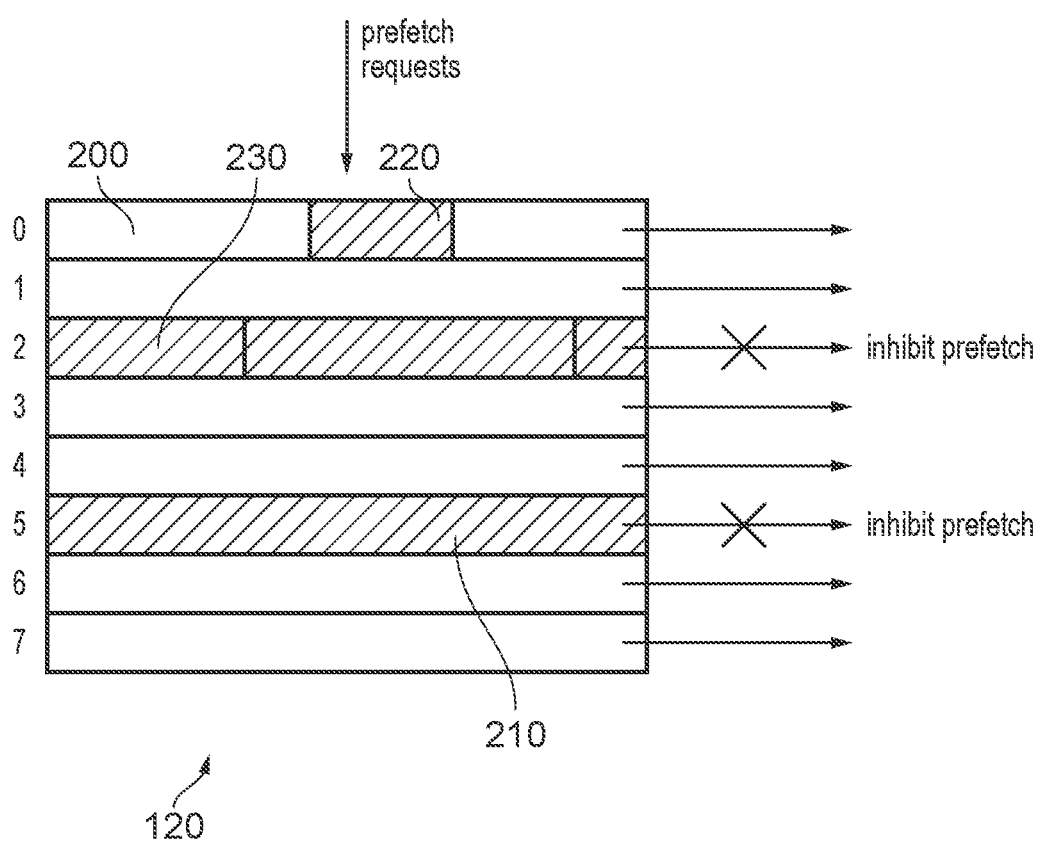
FIG. 2 shows the operation of the store prefetch filter in more detail.

FIG. 2 shows the operation of the store prefetch filter 120 in more detail. In this example, the store prefetch filter 120 stores 8 entries. Each of the entries corresponds with a cache line for which a prefetch request has been generated by the prefetch circuitry 110. Each entry tracks a cache line that has been sought by a prefetch request within a recent window of recent requests, and particularly the portions of that cache line that are predicted by the prefetcher to be modified (i.e. the parts of the cache line that are predicted as being accessed by the predicted accesses for which the prefetch requests were generated). When a cache line becomes 'completed' in the store prefetch filter 120, the corresponding prefetch for that cache line is inhibited—that is, the prefetch is quashed and not forwarded to the issue circuitry 130. In contrast, if the prefetch requests within the window of time are not being generated in order to modify the entirety of the cache line, then the prefetch is permitted to proceed to the issue circuitry 130, and from there the prefetch line is fetched from the memory system (e.g. the memory hierarchy).

For example, consider a first prefetch request directed to a cache line identified by address 0x39388FF0. This cache line is stored at entry 0—its exact location in the filter 120 is immaterial. Over a subsequent X prefetch requests, the store prefetch filter 120 monitors whether prefetch requests are made in order to perform stores that encompass the whole of the cache line. The shaded area 220 indicates, for instance, that prefetch requests have been made in order to enable stores to part of that cache line, meaning that the data at that part of the cache line 200 will be overwritten. After the X store operations have taken place, the entirety of the entry 200 has not been marked. Consequently, the entry 200 is removed from the store prefetch filter 120 and the prefetch is permitted to proceed. In contrast, consider another cache line identified by address 0x2F5BC820. This is stored at entry 5. Within the window of the following X subsequent prefetch requests is a prefetch request that seeks to access the cache line for the purposes of modifying the entire cache line. The entire cache line is therefore shaded. Consequently, the entry is removed and the prefetch request does not proceed to the issue circuitry 130 and the prefetch is not issued. This therefore avoids the situation in which a cache line is prefetched only for all of the data in that cache line to be overwritten. A further example 230 is illustrated in entry 2. Here, a number (3) of prefetch requests cause all of the cache line to be marked. This might occur, for instance, via a first prefetch request that is made for a predicted store to lower bits of the cache line, a second prefetch request that is made for a predicted store that seeks to writes to middle bits of the cache line, and a third prefetch request that is made for a predicted store to top bits of the cache line. In any event, over X prefetch requests (including the current one), at least some of those prefetch requests cause the entire cache line to be marked. Consequently, the prefetch associated with that cache line is quashed. In some examples, L and X are the same.

In some examples, each entry additionally remains in the prefetch filter 120 for up to Y processor cycles before being removed and allowed to proceed. This helps to prevent an entry remaining for so long that the prefetch will be late or sent after the associated demand store has been sent in a system where prefetches occur infrequently, for instance.

It will be clear that, since each prefetch request could write a different number of bytes of a cache line, the number of prefetch requests that will cause a cache line to become completely marked will vary. In some instances, it might be one single prefetch request. In other instances, it will be X prefetch requests. In any event, once the window of X prefetch requests has passed, if the entire cache line has not been marked (i.e. if not every byte of the cache line is predicted as being written to) then the prefetch is allowed to proceed.

Figure 3:
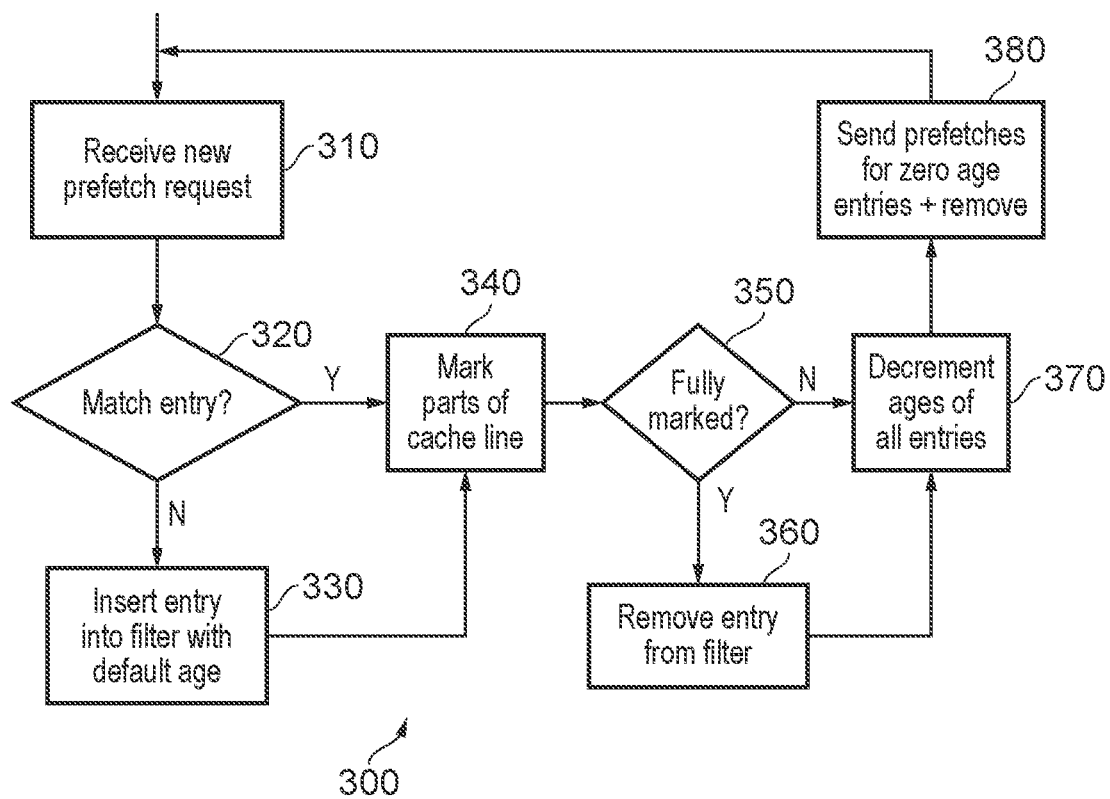
FIG. 3 illustrates the process in the form of a flowchart.

FIG. 3 illustrates the process in the form of a flowchart 300. The process begins at a step 310 where a new (store) prefetch request is received. At a step 320, it is determined whether the prefetch request matches any existing entry in the store prefetch filter 120. In particular, this requires that the prefetch request is predicted as being required for bytes that fall within a cache line represented by an existing entry in the store prefetch filter 120. If not, then at step 330, a new entry is inserted into the store prefetch filter 330 that corresponds to the cache line that the prefetch request was directed towards. The 'age' of the new entry is set to a default value. The process then proceeds to step 340, which is discussed later. The default value for the age is set keeping in mind that if the initial age is set to a size greater than the filter, the filter could get full and unable to accept any more stores before the age reaches zero. If the age is set too small then some filter entries may not be allocated resulting in wasted capacity. In some examples, therefore, the default age is set to the size of the filter minus one.

If, at step 320, there is a match on the entry, then the process proceeds to step 340. At step 340, the parts of the cache line for which the new prefetch request is generated at step 340 are marked. The process then proceeds to step 350, which determines whether that entry is now fully marked. If not, then the process proceeds to step 370. Otherwise, at step 360, the entry is removed from the store prefetch filter and the process proceeds to step 370.

At step 370, the age of all remaining entries is decremented. Then at step 380, a prefetch is issued for each entry whose age has reached zero. Those entries are then removed from the prefetch filter 120. The process then returns to step 310.

In this way, if prefetches are not generated within a number of prefetch requests, for predicted stores to the entire cache line, then it is predicted that the entire cache line will not be modified and so a prefetch for that line is issued. The prefetch causes the data to be moved up the memory hierarchy (e.g. to a level one cache) from which the data can be quickly modified and accessed as necessary. Otherwise, the entirety of the cache line is to be modified and so there is no value in prefetching that cache line. Thus, no prefetch is issued and so bandwidth is saved. In short, the store prefetch filter seeks to merge prefetch requests and remove those that collectively seek access to every byte of a cache line.

In this example, parts of a cache line that are predicted to be modified are accessed. Of course, in other examples, the cache lines could start fully marked and could be unmarked as the parts of the cache line are modified with completely unmarked cache lines being checked for at step 350 and with an entry being removed at step 360 if the entry for a cache line is completely unmarked. Similarly, age decrementing is performed at step 370. An alternative would be to start the lifetime of each entry at age at step 330, to increment the ages at step 370, and then to remove entries at step 380 whose lifetime had reached a default value.

FIG. 4A shows a first example of an implementation of the store prefetch filter 120. In this example, the table is made up of a base address, a set of marks, and an age. The base address represents the base address of a cache line. Here we have assumed that each base address of the cache line is 32 bits with each cache line being 64 bytes long. The marks field indicate which portions of the cache line are predicted as being modified by stores for which prefetch requests are issued. In this example, it is assumed that the cache lines are 64 bytes long, that the cache lines are monitored at a byte level of granularity and therefore the marks field is 64 bits (one bit per fragment or byte in this case). Finally, the age field is used to represent how much longer the entry has to live before it is removed from the store prefetch filter table 400 and a prefetch is issued for the cache line at the specified base address.

The first entry is therefore directed towards a cache line having a base address of 0xFF112211. The marks field 'F00A 0000 0000 0000' corresponds in binary to the number '1111 0000 0000 0000 0110 0000 0000 . . . .' meaning that prefetching is requested for predicted stores to bytes 64, 63, 62, 61, 47, and 46. Meanwhile, the age of 4 means that within the next four prefetch requests the entry will be removed—either with a prefetch (if the entirety of the marks have not been set) or without a prefetch (if the entirety of the marks have been set—e.g. if the marks field is 'FFFF FFFF FFFF FFFF').

The fourth entry is directed towards a cache line having a base address of 0x00001110. The marks field 'FFFF FFFF FFFF FFFF FFFF' signifies that the entry has been fully marked. Consequently, the entry will be removed and no prefetch will be generated because the data for the cache line is predicted to be completely overwritten.

The fifth entry is directed towards a cache line having a base address of 0x1100BB00. Here, the marks field is 'FFFF FF0F FFFF FFFF' indicating that the entry has almost been completely marked, but not quite. However, the age field is now 0. This means that the entry will be deleted and a prefetch will be generated. In practice, most of the prefetched data will be modified. However, the data is still fetched because the unchanged portion of the cache line is still required (since there is no replacement for that portion).

The above examples consider granularity in the form of bytes. However, the 64 byte cache line could instead be treated as a 16 word cache line, and the marks field could therefore be reduced to 16 bits.

FIG. 4B shows an alternative representation 410. Here, the base field and the age field both remain the same. However, the marks field is substantially smaller. This field represents a contiguous set of bytes of a cache line for which prefetches are requested. The T/B field indicates whether this contiguous set of bytes extends from the top or the bottom of the cache line. This representation can be achieved in a much smaller fashion. For instance, for a 64 byte cache line requires a 64 bit marks field (assuming modifications are monitored at a byte level of granularity). In contrast, since the example of FIG. 4B only refers to a single byte, this can be achieved using $\log_2(N)$ bits, where N is the number of bytes of the cache line. In this example, it can be achieved in $\log_2(64)=6$ bits, together with a T/B bit, for a total of 7 bits. This provides a significant saving over the 64 bits required in FIG. 4A.

A consequence of this representation is that it may not possible to track that a cache line is completed if predicted accesses occur from the middle of a cache line and work outwards. For instance, if the first access of a series of predicted accesses causes a modification to bits 32-40, then there is no way to represent this using the example of FIG. 4B. Such a representation is possible, however, if a previous access causes a modification of bits 0-31 or bits 41-63. The consequence of this is that complete cache lines may not be detected and consequently, prefetches may be sent unnecessarily.

This limitation is not considered significant for several reasons. Firstly, the cost of sending unnecessary prefetches is not an enormous performance penalty as compared to the cost of not sending prefetches when appropriate. Secondly, it is expected that in most cases, memory accesses will cause cache lines to be bisected. This happens, for instance, where a memory access occurs across two cache lines. In this case, it will be the top bytes of one cache line and the bottom bytes of another cache line that will be modified. This is precisely what the example of FIG. 4B is able to detect. Here, when a series of contiguous cache lines are accessed with each access occurring across two cache lines, the (overall) complete access of each cache line can still be detected and the prefetches can be inhibited.

The first entry is therefore directed towards a cache line having a base address of 0x14CDE101. The value of 12 in the marks field and the value of T for the T/B field means that the top 64-12=52 contiguous bytes of the cache line are predicted to be accessed. Meanwhile the age of 3 indicates how many more prefetch requests can be performed before the entry will be removed.

The third entry is directed towards a cache line having a base address of 0x11004EE0. The value of 0 in the marks field and the value of T for the T/B field means that the top 64-0=64 contiguous bytes of the cache line are predicted to be modified. The age of 6 means that, in theory, the entry would remain for up to 6 more prefetch requests. However, since the marks field clearly indicates that the cache line has been fully modified, the entry will be removed with no prefetch being generated.

The fourth entry is directed towards a cache line having a base address of 0x12DEF000. The value of 62 in the marks field and the value of B for the T/B field means that the bottom 62 contiguous bytes of the cache line have been modified. The age of 0 means that the entry will now be removed and even though most of the bytes of the cache line will be modified, the cache line will still be prefetched. If the age was 1 and the next prefetch request were to access the remaining two bytes, then the entry would be removed without the prefetch being generated.

Consequently, it can be seen how a stream of store operations, with the stream being mixed between complete cache line writes and partial cache line writes can be efficiently prefetched. Where a cache line is predicted to be modified in its entirety, the prefetch can be inhibited thereby reducing bandwidth consumption. In contrast, if it is predicted that the entire cache line will not be modified then the cache line is prefetched. This offers an improvement over a system that, for instance, swaps between prefetch mode and non prefetch mode (depending on whether the operations are mostly performing complete cache line writes or partial cache line writes), which will generally perform poorly with mixed operations.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
   prefetch circuitry configured to generate a prefetch request for a cache line prior to the cache line being explicitly requested, wherein the cache line is predicted to be required for a store operation in the future;
   issuing circuitry to issue the prefetch request to a memory hierarchy; and
   filter circuitry configured to filter out the prefetch request based on at least one other prefetch request made to the cache line, to control whether the prefetch request is issued by the issuing circuitry.

2. The data processing apparatus according to clause 1, wherein
   the filter circuitry is configured to filter out the prefetch request based on an amount of the cache line that is required by the at least one other prefetch request made to the cache line.

3. The data processing apparatus according to any preceding clause, wherein
   the filter circuitry is configured to filter out the prefetch request such that the prefetch request is inhibited from being issued by the issue circuitry in response to all of the cache line being predicted as being accessed by one or more predicted accessed for which the at least one other prefetch request is generated.

4. The data processing apparatus according to any preceding clause, wherein
   the filter circuitry is configured to filter out the prefetch request such that the prefetch request is issued by the issue circuitry in response to only a part of the cache line being predicted as being accessed by one or more predicted accesses for which the at least one other prefetch request is generated.

5. The data processing apparatus according to any preceding clause, wherein
   the at least one other prefetch request is one of a predetermined number of recent prefetch requests.

6. The data processing apparatus according to any preceding clause, comprising:
   a store buffer configured to buffer store operations prior to being issued to the memory hierarchy, wherein the store buffer is configured to merge those of the store operations that are directed towards a same cache line.

7. The data processing apparatus according to clause 6, wherein
   the filter circuitry is configured to store a plurality of entries, each of the entries having an associated cache line; and
   for each of the entries, the filter circuitry is configured to track parts of the associated cache line to which the at least one other prefetch request has been made.

8. The data processing apparatus according to clause 7, wherein
   a capacity of the store buffer is at least as big as a capacity of the filter circuitry.

9. The data processing apparatus according to any one of clauses 7-8, wherein
   the filter circuitry is configured to store, for each of the entries, an N-bit bitfield to indicate which of the N bytes of the associated cache line are predicted as being accessed by predicted accesses for which the at least one other prefetch request—is generated.

10. The data processing apparatus according to any one of clauses 7-8, wherein
    the filter circuitry is configured to store, for each of the entries, an offset within the associated cache line; and
    an indication of which of:
      bytes in the cache line above the offset and
      bytes in the are predicted as being accessed by predicted accesses for which the at least one other prefetch request is generated.

11. The data processing apparatus according to clause 10, wherein
    the offset is represented using a $\log_2(N)$ bit bitfield, where N is the number of fragments of the associated cache line that are individually tracked; and
    the indication is represented using a 1-bit field.

12. The data processing apparatus according to any preceding clause, wherein
    the prefetch request is a store prefetch request; and
    the at least one other prefetch request is at least one other store prefetch request.

13. A data processing method comprising:
    generating a prefetch request for a cache line prior to the cache line being explicitly requested, wherein the cache line is predicted to be required for a store operation in the future;
    filtering the prefetch request based on at least one other prefetch request made to the cache line, to control whether the prefetch request is issued; and
    issuing the prefetch request to a memory hierarchy in dependence on the filtering.

14. A non-transitory computer-readable medium to store computer-readable code for fabrication of a data processing apparatus comprising:
    prefetch circuitry configured to generate a prefetch request for a cache line prior to the cache line being explicitly requested, wherein the cache line is predicted to be required for a store operation in the future;

issuing circuitry to issue the prefetch request to a memory hierarchy; and filter circuitry configured to filter out the prefetch request based on at least one other prefetch request made to the cache line, to control whether the prefetch request is issued by the issuing circuitry.

What is claimed is:

1. A data processing apparatus comprising:
prefetch circuitry configured to generate a prefetch request for a cache line prior to the cache line being explicitly requested, wherein the cache line is predicted to be required for a store operation in the future;
issuing circuitry to issue the prefetch request to a memory hierarchy; and
filter circuitry configured to filter out the prefetch request based on at least one other prefetch request made to the cache line, to control whether the prefetch request is issued by the issuing circuitry,
wherein the filter circuitry is configured to filter out the prefetch request based on an amount of the cache line that is required by the at least one other prefetch request made to the cache line.

2. The data processing apparatus according to claim 1, wherein
the filter circuitry is configured to filter out the prefetch request such that the prefetch request is inhibited from being issued by the issue circuitry in response to all of the cache line being predicted as being accessed by one or more predicted accessed for which the at least one other prefetch request is generated.

3. The data processing apparatus according to claim 1, wherein
the filter circuitry is configured to filter out the prefetch request such that the prefetch request is issued by the issue circuitry in response to only a part of the cache line being predicted as being accessed by one or more predicted accesses for which the at least one other prefetch request is generated.

4. The data processing apparatus according to claim 1, wherein
the at least one other prefetch request is one of a predetermined number of recent prefetch requests.

5. The data processing apparatus according to claim 1, comprising:
a store buffer configured to buffer store operations prior to being issued to the memory hierarchy, wherein the store buffer is configured to merge those of the store operations that are directed towards a same cache line.

6. The data processing apparatus according to claim 5, wherein
the filter circuitry is configured to store a plurality of entries, each of the entries having an associated cache line; and
for each of the entries, the filter circuitry is configured to track parts of the associated cache line to which the at least one other prefetch request has been made.

7. The data processing apparatus according to claim 6, wherein
a capacity of the store buffer is at least as big as a capacity of the filter circuitry.

8. The data processing apparatus according to claim 6, wherein
the filter circuitry is configured to store, for each of the entries, an N-bit bitfield to indicate which of the N bytes of the associated cache line are predicted as being accessed by predicted accesses for which the at least one other prefetch request—is generated.

9. The data processing apparatus according to claim 6, wherein
the filter circuitry is configured to store, for each of the entries, an offset within the associated cache line; and
an indication of which of:
bytes in the cache line above the offset and
bytes in the are predicted as being accessed by predicted accesses for which the at least one other prefetch request is generated.

10. The data processing apparatus according to claim 9, wherein
the offset is represented using a $\log_2(N)$ bit bitfield, where N is the number of fragments of the associated cache line that are individually tracked; and
the indication is represented using a 1-bit field.

11. The data processing apparatus according to claim 1, wherein
the prefetch request is a store prefetch request; and
the at least one other prefetch request is at least one other store prefetch request.

12. A data processing method comprising:
generating a prefetch request for a cache line prior to the cache line being explicitly requested, wherein the cache line is predicted to be required for a store operation in the future;
filtering the prefetch request based on at least one other prefetch request made to the cache line, to control whether the prefetch request is issued; and
issuing the prefetch request to a memory hierarchy in dependence on the filtering,
wherein the prefetch request is filtered out based on an amount of the cache line that is required by the at least one other prefetch request made to the cache line.

13. A non-transitory computer-readable medium to store computer-readable code for fabrication of a data processing apparatus comprising:
prefetch circuitry configured to generate a prefetch request for a cache line prior to the cache line being explicitly requested, wherein the cache line is predicted to be required for a store operation in the future;
issuing circuitry to issue the prefetch request to a memory hierarchy; and
filter circuitry configured to filter out the prefetch request based on at least one other prefetch request made to the cache line, to control whether the prefetch request is issued by the issuing circuitry,
wherein the filter circuitry is configured to filter out the prefetch request based on an amount of the cache line that is required by the at least one other prefetch request made to the cache line.

* * * * *